United States Patent [19]

Apgar

[11] Patent Number: 5,181,674
[45] Date of Patent: Jan. 26, 1993

[54] WIND DRIVEN CRAFT

[75] Inventor: William J. Apgar, Duncraig, Australia

[73] Assignee: Sea Shelf Engineering Pty Ltd., Australia

[21] Appl. No.: 602,337

[22] PCT Filed: May 16, 1989

[86] PCT No.: PCT/AU89/00208
§ 371 Date: Jan. 8, 1991
§ 102(e) Date: Jan. 8, 1991

[87] PCT Pub. No.: WO89/11417
PCT Pub. Date: Nov. 30, 1989

[30] Foreign Application Priority Data

May 16, 1988 [AU] Australia ................. PI8245

[51] Int. Cl.$^5$ .............................. B64C 31/02
[52] U.S. Cl. ..................... 244/47; 244/16; 244/101; 114/273
[58] Field of Search ............... 244/7 C, 16, 47, 49, 244/101; 114/39.2, 272, 273

[56] References Cited

U.S. PATENT DOCUMENTS

| 1,710,670 | 4/1929 | Bonney. | |
|---|---|---|---|
| 1,724,755 | 8/1929 | Ferruzzi. | |
| 1,802,825 | 4/1931 | Morris. | |
| 1,834,858 | 12/1931 | Metzler | 244/47 |
| 1,945,254 | 1/1934 | Bittner | 244/47 |
| 2,074,099 | 3/1937 | Adams | 244/47 |
| 3,614,024 | 10/1971 | Millman. | |
| 3,817,478 | 6/1974 | McDonald. | |
| 3,899,146 | 8/1975 | Amick | 244/16 |
| 3,987,982 | 10/1976 | Amick | 244/16 |
| 4,357,777 | 10/1982 | Kulik | 244/47 |
| 4,478,164 | 10/1984 | Menear | 114/39.2 |

FOREIGN PATENT DOCUMENTS 3130554 3/1983 Fed. Rep. of Germany ...... 114/274
1578787 11/1980 United Kingdom.

Primary Examiner—Margaret A. Focarino
Assistant Examiner—Carla Mattix
Attorney, Agent, or Firm—John S. Hale

[57] ABSTRACT

A wind driven craft comprising a body and a pair of wings extending therefrom. The wings are pivotally connected to the body of the craft. The wings provide lift and thrust to the craft such that it is able to move under influence of the wind.

17 Claims, 5 Drawing Sheets

WIND DRIVEN CRAFT

DESCRIPTION

The present invention relates to a wind driven craft.

FIELD OF THE INVENTION

The present invention provides a wind driven craft which may travel on water.

With modifications, the craft may be arranged to travel on substantially solid surfaces.

Further, the present invention provides a craft which can be arranged for flight, either as a glider or under motor power.

SUMMARY OF THE INVENTION

In accordance with one aspect of the present invention there is provided a wind driven craft characterised in that it comprises a body and a pair of wings pivotally attached to and extending from said body to provide lift and thrust to said craft such that said craft may move under influence of the wind, wherein said wings are pivotable individually about at least one substantially longitudinal axis of said body and are lockable in a selected relative position such that they are pivotable in unison about said axis.

DESCRIPTION OF THE INVENTION

Figure 1:
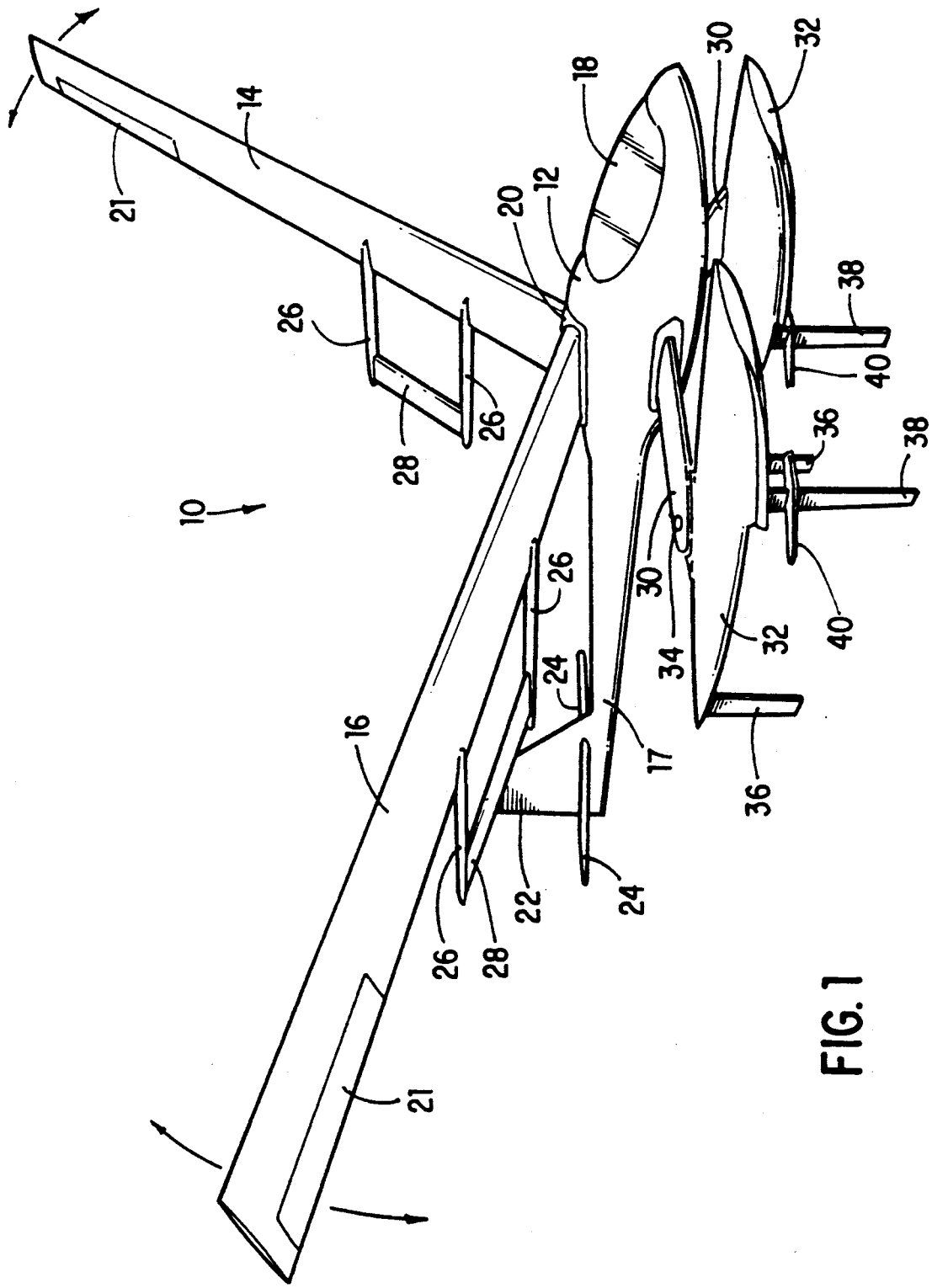
FIG. 1 is a perspective view of a first embodiment of the craft of the present invention.

In FIG. 1 there is shown a wind driven craft 10 for use on water.

The craft 10 comprises a body 12 and a pair of wings 14 and 16 attached thereto. The body 12 is substantially of fuselage form and comprises a tail boom 17 and a cockpit or operator/passenger compartment 18.

The wings 14 and 16 are connected to a rigid joint 20. The rigid joint 20 is pivotally connected to the body 12 about an axis substantially parallel to the longitudinal axis of the body 12. The pivotal directions of the craft 10 are shown by arrows in FIG. 1.

The wings 14 and 16 may be provided with control surfaces or ailerons 21.

The wings 14 and 16 are driven into the required position by mechanical means or may be flown into the required position by the ailerons 21.

The wings 14 and 16 may be retained in their required relative position by suitable means, e.g. struts, latches and/or cables.

An air rudder 22 and elevators 24 are provided at the rear of the body 12. The air rudder 22 consists of a vertical steering fin assembly whilst the elevators 24 consist of horizontal airfoil plane structures.

Alternative tail configurations are also possible, e.g. a vee tail.

The air rudder 22 and elevators 24 control pitch and yaw of the craft 10. The angle of attack and hence the lift/thrust of the wings 14 and 16 are controlled by control surfaces 28 attached to each of the wings 14 and 16. Two aerodynamic control surfaces 28 are pivotably held by struts 26 which are attached to each wing 14 and 16. In this case, each of the wings 14 and 16 is also able to pivot about an axis substantially parallel to its longitudinal axis.

Accordingly, the ailerons 21 (and/or conventional flap means) may be used to alter the lift characteristics of each wing for purposes of trim and control.

The ailerons 21 and control surfaces 28 provide aerodynamic control such that wing loading is controllable separately. The craft 10 further comprises an outrigger 30 extending from each side of the body 12. A hull 32 is pivotally attached at the distal end of each of the outriggers 30 by a connection 34 which allows the hulls 32 to pivot about a substantially vertical axis.

The outriggers 30 are attached to the body 12 by suspension elements (not shown). These suspension elements allow vertical motion of the hulls 32. The pivotal connections 34 allow steering motion of the hulls 32 relative to the remainder of the craft 10.

The outriggers 30 support the body 12 and allow for vertical compliance for negotiating uneven water surfaces such as waves.

The hulls 32 are provided with rudders 36 at their rears which control their direction of steer.

The hulls 32 may be stepped, planing type hulls such that at increased speeds the wetted area is reduced and the planing point is near the centre of mass of the craft 10. As an alternative, a central single hull (not shown) integral with the body 12, may be used. Such a hull may be used with or without smaller outboard floats.

One or more skegs 38 are provided on each of the hulls 32. The skegs 38 may be air foil shaped or super cavatating shaped. Super cavatating foils are used for high speeds. As an alternative, a central skeg (not shown) may be mounted under the body 12.

Planing or lift foils 40 are mounted on the skegs 38 and arranged substantially at right angles thereto. The planing/lift foils 40 tend to lift the hulls 32 clear of the water and to plane on the surface of the water. This allows the planing/lift foils 40 to penetrate breaking waves reducing slamming forces and energy absorption by waves.

As an alternative, a central single or multiple planing-/lift foil (not shown) with active suspension may be used. Such a central planing/lift foil may or may not be integral with a central skeg (not shown).

The central foil is rotationally attached to the craft 10. A rudder assembly (not shown) may be attached to an arm or strut (not shown) rearward of the skeg to control the angle of attack of the skeg.

Operator controls (not shown) are provided in the compartment 18 such that an operator seated therein may control the direction of travel of the craft 10 and other control elements, hereinbefore described, for regulating the vertical orientation, wing position and speed of the craft 10.

The pivoting of the wings 14 and 16 is controlled by a latch and/or brake mechanism which releases and subsequently holds the wings 14 and 16 in the required position.

The control surfaces 28 are pivotable relative to the struts 26 and operator controls are provided in the compartment 18 for this. The rudders 36 are steered by means of hand or foot operated controls. This controls the direction of travel of the craft 10. The rudders 36 are connected to operator controls in the compartment 18 by a linkage system. The linkage system may be a reflex type system such that once an angle setting is made the rudders 36 tend to steer the hulls 32 into that angle relative to the body 12. If the hulls 32 pivot away from that angle the linkage system causes the rudders 36 to pivot to return the hulls 32 back to the desired angle setting.

Alternative rudder systems may be employed whereby the rudders are steered to a desired angle setting and/or the rudder is attached to a skeg on a boom assembly.

The wings 14 and 16 are positioned at a fixed relative angle to one another. This angle is determined to provide optimum performance of the craft 10. However, the wings 14 and 16 may pivot relative to one another and then be locked into their relative position once the required angle of separation has been set.

Accordingly, the wings 14 and 16 may pivot relative to one another about a single substantially longitudinal axis, or alternatively, each wing 14 and 16 may pivot about a respective individual substantially longitudinal axis. Independent pivoting of the wings 14 and 16 allow them to be both positioned in a substantially horizontal position such that the craft 10 may operate as a glider. The wings 14 and 16 may be constructed of any suitable material and may be non-rigid (e.g. cloth), rigid (e.g. fibreglass, wood, etc), internally braced (e.g. spars, beams) or externally braced (e.g. guy wires, struts, etc).

Figure 2:
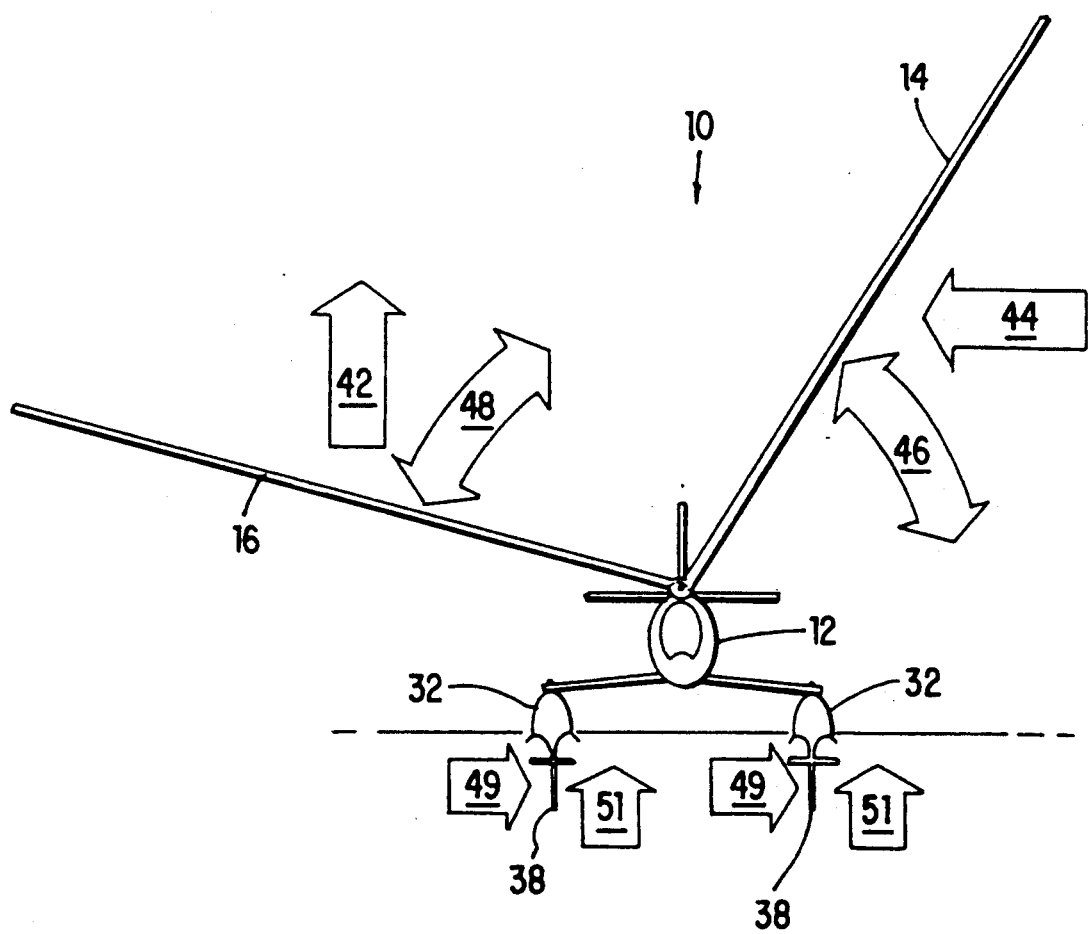
FIG. 2 is a front elevational view of the craft shown in FIG. 1 showing an analysis of forces acting on the craft 10 for a particular orientation of the wings with the wind direction being into the page.

In FIG. 2, there is shown a schematic front view of the craft 10 showing a force analysis for the craft 10.

In the configuration of the wings 14 and 16 shown in FIG. 2, the wing 16 is substantially horizontal and produces mostly lift for the craft 10, shown by the arrow 42, whilst the wing 14 is substantially upright and produces mostly thrust, shown by the arrow 44.

An overturning force, shown by arrow 46, is balanced by a righting force, shown by arrow 48.

The skegs 38 project below the surface of the water and provide a horizontal reaction or water thrust as a reaction to the horizontal thrust 44. This is shown by the arrows 49. The angle between the skegs 38 and the thrust wing (being wing 14 in FIG. 2) is such that it produces a vector sum resulting in forward thrust for the craft 10. The planing/lift foils 40 provide lift to the hulls 32, shown by arrows 51.

The rudder 22 and elevators 24 at the tail of the craft 10 provide directional control for the lifting and thrusting wings 16 and 14.

The wings 14 and 16 may be pivoted about the axis that lies parallel to the longitudinal axis of the body 12 to effect tacking/jibing. This may be done by way of mechanical means or ailerons 21 as hereinbefore described by the operator operating the appropriate controls.

Figure 3A:
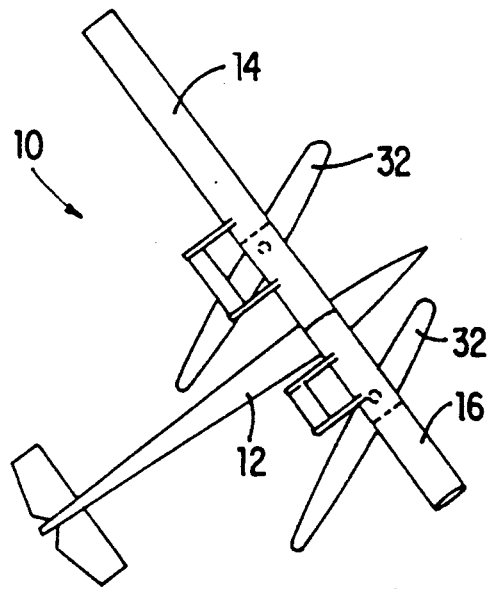
FIGS. 3a and 3b show the positions of the wings and hulls for a starboard tack.
Figure 3B:
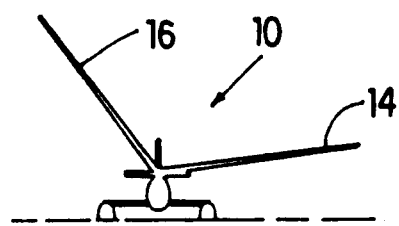

FIGS. 3a and 3b show the positions to which the wings 14 and 16 and the hulls 32 are pivoted to effect a starboard tack with the direction of the wind shown by the arrow 50. The wings 14 and 16 are pivoted such that the wing 16 produces mostly thrust, whilst the wing 14 produces mostly lift. The hulls 32 are pivoted in the required direction as shown.

Figures 5A, 5B:
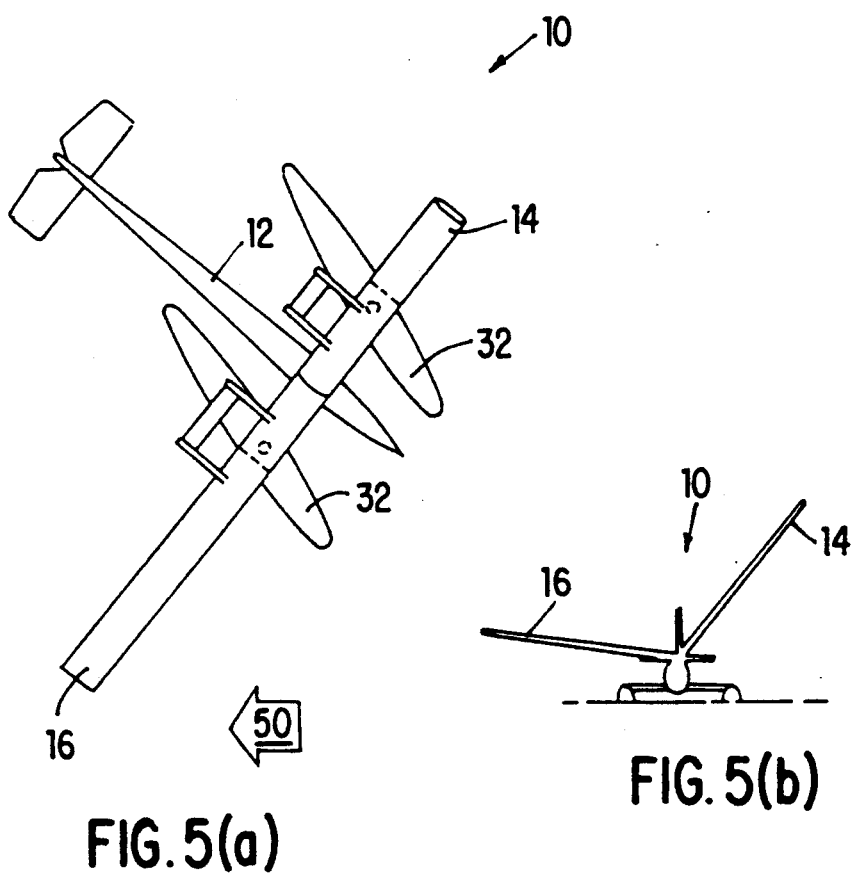
FIGS. 5a and 5b show the positions of the wings and hulls for a port tack.

FIGS. 5a and 5b show the positions to which the wings 14 and 16 and the hulls 32 are pivoted to effect a port tack, the wind direction being shown by the arrow 48.

These positions are the reverse of those for the starboard tack shown in FIGS. 3a and 3b.

Figure 4A:
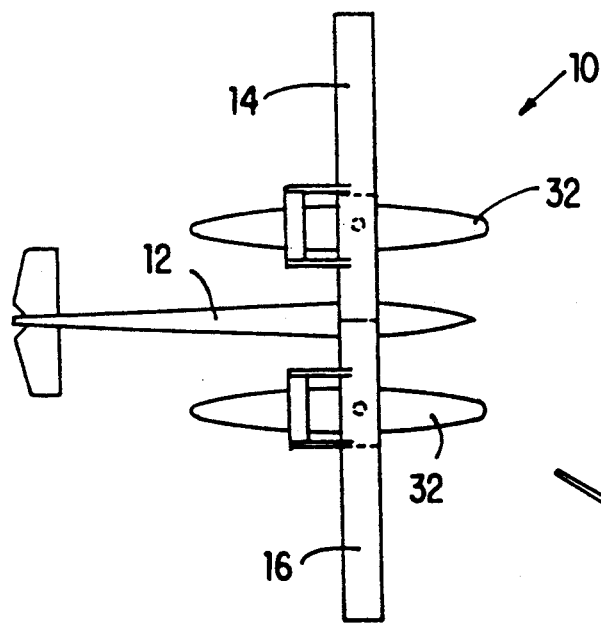
FIGS. 4a and 4b show the positions of the wings and hulls for travel into the wind.
Figure 4B:
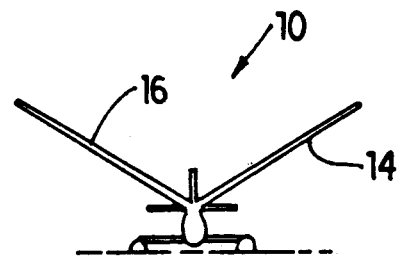

FIGS. 4a and 4b show the positions of the wings 14 and 16 and the hulls 32 when the craft 10 is being driven into the wind. The wind direction is again shown by arrow 50. The symmetrical position of the wings 14 and 16 means that they produce a substantially equal amount of lift and thrust so that the craft 10 moves in the forward direction. The hulls 32 are positioned in the forward pointing direction.

Figure 6:
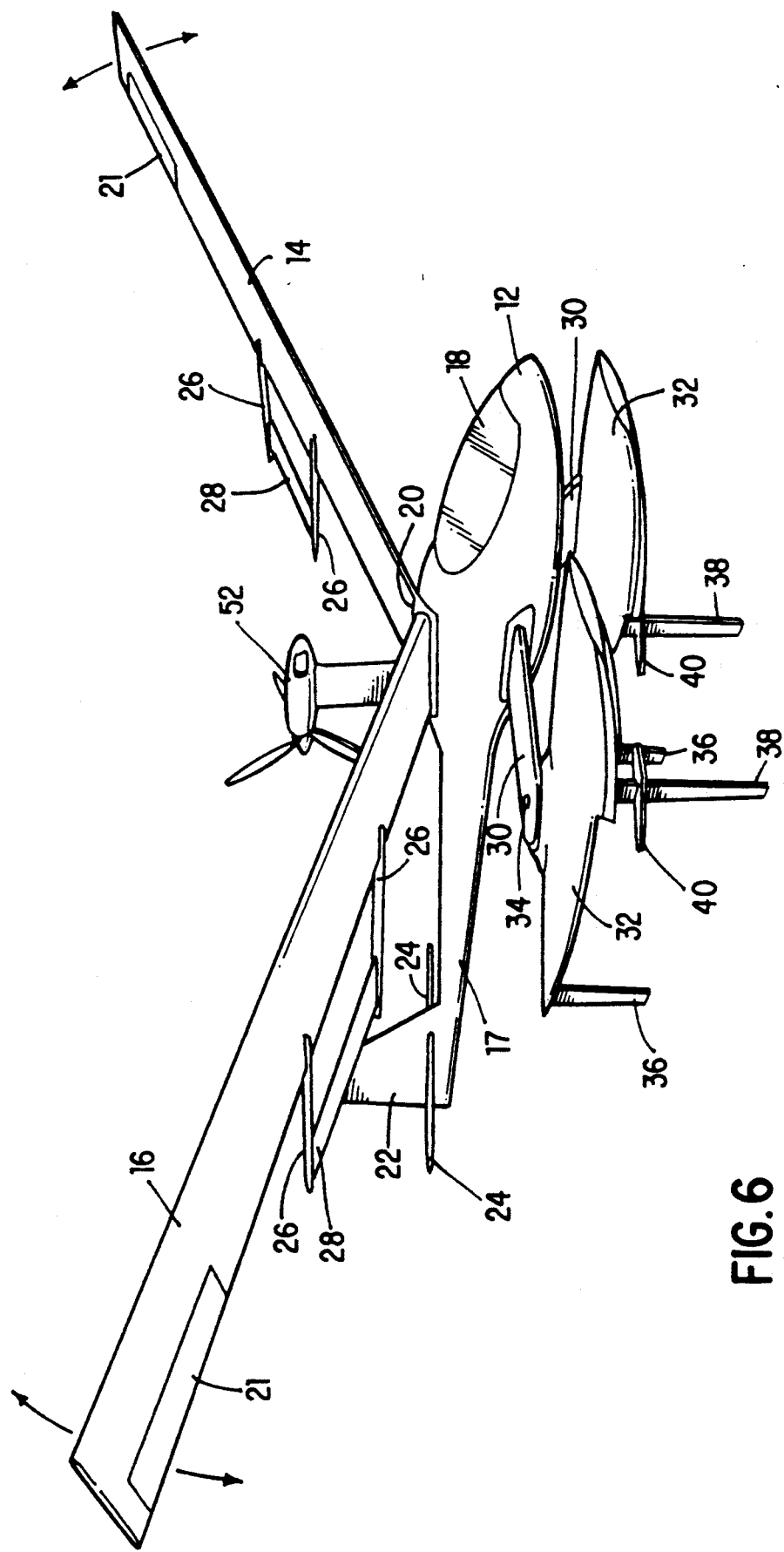
FIG. 6 shows a perspective view of a second embodiment of the craft of the present invention.

FIG. 6 shows another embodiment of a craft 10a. The craft 10a is similar to the craft 10 except that it is provided with a motor and propeller assembly 52. The wings 14 and 16 of the craft 10a may be locked in a substantially horizontal position such that the craft 10a may operate as an aircraft.

The craft of the present invention may also be provided as a wind driven craft for travel on substantially solid surfaces, e.g. land, ice, snow etc. In such an embodiment the hulls 32 of the craft 10 of the first embodiment are replaced by wheels skates, runners, etc. or appropriate traction means for the particular terrain over which the craft is to be driven.

In the craft for travel on substantially solid surfaces the wings 14 and 16 providing lift and thrust are installed on opposite sides of the craft 10 to that in the water going craft 10.

This results in the forces being in balance but with the main "lift" force being downward rather than upward.

I claim:

1. A wind driven craft comprising:
   a body;
   a pair of wings pivotably attached to and extending from said body, each one of said pair of wings having a respective longitudinal axis;
   said wings being pivotable individually about at least one substantially longitudinal axis of said body and lockable in a selected relative position such that they are pivotable in unison, the pivotability of said wings about said at least one substantially longitudinal axis of said body enabling each wing to be pivoted individually into a selected position and locked in said selected position such that one said wing provides primarily lift and the other said wing provides primarily thrust to said wind driven craft;
   said wings being pivotable individually about a respective axis which is substantially parallel to the respective longitudinal axis of each wing;
   aerodynamic control surface means positioned rearwardly of each said wing and connected thereto by respective strut means such that each said aerodynamic control surface means is pivotably held by said respective strut means;
   said aerodynamic control surface means adapted to be pivoted to cause a respective wing to pivot about a said axis substantially parallel to the longitudinal axis of a said wing to thereby enable the lift/thrust forces on a respective wing to be controlled such that the angle of attack of a respective wing may be changed relative to air flow to thereby alter the lift/thrust force on a said wing.

2. A wind driven craft according to claim 1, wherein said craft is further provided with hull means to support said craft on water, skeg means freely rotatable relative to said body and arranged to extend into the water to provide a water reaction force to thrust provided by said other wing, and rudder means arranged to extend into the water to provide steering control to said craft on the water.

3. A wind driven craft according to claim 1, wherein tail means is provided at the rear of said craft to enable pitch and yaw to be controlled and each wing is provided with aileron means which may be used to alter lift characteristics of each said wing for the purposes of trim and control.

4. A wind driven craft according to claim 1, wherein tail means is provided at the rear of said craft to enable pitch and yaw to be controlled and each wing is provided with flap means which may be used to alter lift characteristics of each said wing for the purposes of trim and control.

5. A wind driven craft according to claim 1, wherein tail means is provided at the rear of said craft to enable pitch and yaw to be controlled and each wing is provided with aileron and flap means which may be used to alter lift characteristics of each said wing for the purposes of trim and control.

6. A wind driven craft according to claim 1, wherein mechanical means is provided which may be used to cause said wings to pivot about said at least one substantially longitudinal axis of said body.

7. A wind driven craft according to claim 1, wherein said craft body is provided with wheel means to support said craft on substantially solid surfaces.

8. A wind driven craft according to claim 1, wherein said craft body is provided with skate means to support said craft on substantially solid surfaces.

9. A wind driven craft according to claim 1, wherein said craft body is provided with runner means to support said craft on substantially solid surfaces.

10. A wind driven craft according to claim 1, wherein said wings are lockable in a manner such that they extend in a substantially horizontal direction on opposite sides of said body such that said craft is operable as a glider aircraft.

11. A wind driven craft according to claim 1, wherein said wings are lockable in a manner such that they extend in a substantially horizontal direction on opposite sides of said body and said craft body is provided with motor assembly means including a propeller such that said craft is operable as a powered aircraft.

12. A wind driven craft according to claim 1, wherein each wing is pivotable about a respective said substantially longitudinal axis of said body.

13. A wind driven craft according to claim 2, wherein planing/lift foil means is mounted to said body to provide water lift to said craft.

14. A wind driven craft according to claim 2, wherein central planing/lift foil means is attached to said skeg means.

15. A wind driven craft according to claim 2, wherein said rudder means is attached to arm means rearward of said skeg means.

16. A wind driven craft according to claim 2, wherein said rudder means is connected to the underside of said hull means.

17. A wind driven craft according to claim 2, wherein said skeg means is connected to the underside of said hull means which is pivotally connected to said body of said craft.

* * * * *